US006451485B1

(12) United States Patent
James et al.

(10) Patent No.: US 6,451,485 B1
(45) Date of Patent: *Sep. 17, 2002

(54) ELECTRICAL ENERGY DEVICES

(75) Inventors: David James, Deal Island, MD (US); Daniel B. Allison, II, McLean, VA (US); John J. Kelley, Mt. Laurel, NJ (US); James B. Doe, Yardley, PA (US)

(73) Assignee: Advanced Power Devices, Inc., Deal Island, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/096,507

(22) Filed: Jun. 12, 1998

Related U.S. Application Data

(63) Continuation of application No. 08/581,298, filed on Dec. 28, 1995, now Pat. No. 5,766,784
(60) Provisional application No. 60/004,553, filed on Sep. 29, 1995.

(51) Int. Cl.$^7$ ................................................ H01M 4/62
(52) U.S. Cl. ........................ 429/232; 429/223; 429/228; 429/235; 429/236; 429/231.95; 501/95.1; 252/519.12; 252/519.33
(58) Field of Search ........................ 501/95.1; 429/223, 429/224, 228, 229, 231.95, 44, 232, 235, 236; 252/519.12, 519.33; 204/431

(56) References Cited

U.S. PATENT DOCUMENTS

| | | | | |
|---|---|---|---|---|
| 2,627,531 A | * | 2/1953 | Vogt ........................ | 429/235 X |
| 3,556,855 A | * | 1/1971 | Howells .................. | 429/235 X |
| 3,703,413 A | * | 11/1972 | Arrance ................... | 429/235 X |
| 3,932,195 A | | 1/1976 | Evans et al. | |
| 4,353,969 A | | 10/1982 | Rippel et al. | |
| 4,422,917 A | | 12/1983 | Hayfield | |
| 4,649,022 A | | 3/1987 | Tischer et al. | |
| 5,045,170 A | | 9/1991 | Bullock et al. | |
| 5,106,709 A | * | 4/1992 | Tekkanat et al. ......... | 429/235 X |
| 5,126,218 A | | 6/1992 | Clarke | |
| 5,173,215 A | | 12/1992 | Clarke | |
| 5,183,594 A | * | 2/1993 | Yoshinaka et al. ...... | 252/519.12 |
| 5,281,496 A | * | 1/1994 | Clarke ..................... | 429/218.1 |
| 5,384,685 A | | 1/1995 | Tong et al. | |
| 5,512,214 A | * | 4/1996 | Koksbang ................ | 429/232 X |
| 5,601,853 A | * | 2/1997 | Bednarz et al. | |
| 5,711,988 A | | 1/1998 | Tsai et al. | |
| 5,766,789 A | * | 6/1998 | James et al. ................... | 429/44 |

FOREIGN PATENT DOCUMENTS

TW  284921  9/1996

OTHER PUBLICATIONS

Henrech et al, The Surface Science of Metal Oxides, pp 138–143, 180–181, 192–193, 210–213, 412–413, Cambridge UniversityPress, 1994 (Month N.A).

Kao et al, Microstrucre and Sintering Properties of La2O3–doped SrTiO3 Ceramcs from Crystalline Powders, Materials Tranactions, JIM, vol. 37, p. 142–149, 1996 (Month Unknown).

A.F. Burke, Ultracapictors:Friendly Competiors and Helpmates for Batters, Presented at the Eleventh International Seminar on Primary and Secondary Battery Technology and Aplication, Feb. 28, 1995.

Scrosati, Lithrium Rocking Chair Batteries: An Old Concept?, J. Electrochem. Soc., vol. 139, No. 10, Oct. 1992.

The Surface Scientce of metla Oxides, Cambridge University Press, 1994, pp. 139–141, 180–181, 192–193, 210–213, and 412–413 (Month N.A.).

Endo et al., "Discharge Characteristics of a Lithium Battery with Fibrous Carbon Fluoride", Journal of Power Sources 20 (1987) pp. 99–104 (month unknown).

Holze et al., "Carbon felt: A new cathode material for Li–and Ca–primary cells", Electrochemical Society Extended Abstacts Extended Abstracts–Fall Meeting (168th Society Meeting), the Electrochemical Society, V 85–2 1985 Las Vegas, NV, USA, Sponsored by: Electrochemical Society, Pennington, NJ, USA Electrochemical Society, Pennington, NJ, USA pp. 171–172 (Oct. 1985).

Kanamura et al., "Diffusion of Lithium in the $TiO_2$ cathode of a lithium battery", Journal of Power Sources, 20 (1987), pp. 127–134 (month unknown).

Onnerud, "Chemical and Electrochemical Intercalation of Lithium into a $V_6O_{13}$ Host", Comprehensive Summaries of Uppsala Dissertations from the Faculty of Science and Technology, (1995), pp. 1–31 (month n/a).

Murphy et al., "Ternary LixTiO2 Phases from Insertation Reactions", Solid Sate Ionics (1983), pp. 413–418 (month unknown).

Takehara et al., "Activation of TiO2 and MnO2 by Vanadium Doping as Cathodes in Nonaqueous Lithium Cells", New Materials & New Processes v 3 (1985) pp. 259–263 (month unknown).

Sakurai et al., "Electrochemical behavior of amorphous V2O5 (minus P2O5) cathodes for lithium secondary batteries", Journal of Power Sources 20 (1987) pp. 173–177 (month unknown).

Swider et al., "Metal–organic depositon of tin–film yttria–stabilized zirconai–titania", J. Mater. Res., vol. 11, No. 2 (Feb. 1996) pp. 381–386.

Wiesener et al., "Vanadium Oxides in Electrodes for Rechargeable Lithiium Cells," Journal of Power Sources, 20 (1987), pp. 157–164 (month unknown).

West et al., "Solid–state sodium cells–and alternative to lithium cells?" Journal of Power Sources 26 (1989) pp. 341–345 (month unknown).

* cited by examiner

Primary Examiner—Stephen Kalafut
(74) Attorney, Agent, or Firm—Law Offices of John A. Parrish

(57) ABSTRACT

The performance of electrochemical energy devices such as batteries, fuel cells, capacitors and sensors is enhanced by the use of electrically conducting ceramic materials in the form of fibers, powder, chips and substrates.

64 Claims, No Drawings

ELECTRICAL ENERGY DEVICES

This application is a continuation of Ser. No. 08/581,298, filed Dec. 28, 1995, now U.S. Pat. No. 5,766,789.

Priority is also claimed to provisional application No. 60/004,553, filed Sep. 29, 1995.

FIELD OF THE INVENTION

The present invention relates to electrochemical devices such as batteries, fuel cells, capacitors and sensors which employ electrically conductive ceramic materials, fibers, powder, chips and substrates therein to improve the performance of the electrochemical device.

BACKGROUND OF THE INVENTION

There are numerous applications which involve the transfer of electrical current in environments which are highly corrosive or otherwise degrading to metallic conductors. Most notably are electrochemical devices operating under highly corrosive conditions and high temperatures. Examples of such applications are the use of electrodes for the chlor-alkali cell to make chlorine gas, electrodes for metal recovery, electrodes in hydrogen/oxygen fuel cells, electrodes for producing ozone, electrolysis of water and electrodes in high temperature solid oxide fuel cells. Most of these applications involve the contact of an electrode with an electrolyte under conditions which render the electrode ineffective during prolonged use. The loss of effectiveness can be gradual, such loss being manifested by reduced current-carrying capacity of the electrode. Exemplary types of conditions which render electrodes ineffective as they are used in current-carrying applications are described below.

One such condition involves chemical attack of the electrode by corrosive gas which is evolved from the electrolyte as it is decomposed during use. For example, the evolution of chlorine gas, a highly corrosive material, from an aqueous chloride-containing electrolyte such as, in the chlor-alkali cell is exemplary.

Another type of condition involves passivation of the electrode as it combines with the anions from the electrolyte to form an insoluble layer on its surface. This passivation condition occurs when the product from the electrochemical reaction can not diffuse from the electrode surface and this produces a blocking of the electrochemical sites and/or pores. The end result is a diminishing of the electrode current carrying capacity. An example of this passivation is the lead dioxide electrode in an aqueous sulfuric acid solution.

Another type of condition which renders electrodes ineffective involves the dissolution of the electrode by the electrolyte. The use of a zinc electrode in an aqueous potassium hydroxide solution is exemplary.

Various types of batteries such as secondary (rechargeable) batteries: lead-acid($Pb/PbO_2$), NaS, Ni/Cd, NiMH(metal hydride), Ni/Zn, Zn/AgO, $Zn/MnO_2$, $Zn/Br_2$; and primary(non-rechargeable) batteries: $Zn/MnO_2$, AgCl/Mg, Zn/HgO, $Al/Air(O_2)$, $Zn/Air(O_2)$, $Li/SO_2$, $Li/Ag_2CrO_4$ and $Li/MnO_2$ exist.

Although a variety of batteries are available, the lead-acid battery remains favored for uses such as starting internal combustion engines, electric vehicle motive power, as well as portable and emergency power for industrial and military applications.

Lead-acid batteries include a cathode comprising a lead alloy grid (active material support structure and electrical network structure contact with the battery terminals) having $PbO_2$ active material thereon; and an anode comprising sponge lead on a grid. The active material on a grid is called the plate and electrically, the anode (Pb) plate is negative and the cathode ($PbO_2$) plate is positive. A separator, either glass fibers or porous plastic, is used to separate the cathode and anode from direct contact when the plates are in sulfuric acid electrolyte. For the lead-acid battery, the rated capacity (ampere-hours) depends on the total amount of electrochemically active material in the battery plates, the concentration and amount of sulfuric acid electrolyte, the discharge rate and the percent utilization (conversion of active material into ampere-hours) for the active materials (the cathode or $PbO_2$ usually being the limiting factor).

During discharge of a lead-acid battery, the lead and lead dioxide active materials are converted to lead sulfate. The lead sulfate can form an undesirable, insulating layer or passivation around the cathode active material particles which reduces the active material utilization during discharge. This passivating layer can be the result of improper battery charging, low temperature operation, and/or excessive (high current) discharge rates. In order to increase the cathode active material utilization, which is desirable for battery performance, means to increase the cathode active material porosity which increases the amount of active material contact with the sulfuric acid and/or active material conductivity which minimizes resistance and electrical isolation of the active material particles are useful. However, raising the cathode active material porosity tends to increase the tendency for a loosening and possible loss of active material from the plate as well as electrical isolation of the active material from the grid structure. Wrapping the cathode plate with a glass mat holds the loosened active material tightly to the plate and minimizes the tendency for active material sediment (electrochemically lost cathode material) in the bottom of the battery container. The addition of conductive materials (carbon, petroleum coke, graphite) to increase the conductivity of the cathode active material is well-known, but these materials are degraded rapidly from the oxygen generated at the cathode during charging.

Since the lead-acid battery anode is very conductive, the additives for the sponge lead active material have concentrated on improving low temperature battery performance and cycle life. The fundamental additive to the anode is the expander which is comprised of lampblack, barium sulfate and lignosulfonic acid mixed with the lead oxide (PbO) carrier agent. The expander addition to the sponge lead inhibits densification or decrease in the sponge lead porosity. If the anode active material becomes too dense, it is unable to operate at low temperatures and can no longer sustain practical current discharges.

In the manufacture of lead-acid batteries, cathode electrodes are usually prepared from lead alloy grids which are filled with an active paste that contains sulfated lead oxide. This sulfated lead oxide is then later converted or formed into sponge lead for the anode and lead dioxide for the cathode. In an alternative construction, known as tubular cathode plates, the cathode active material is a sulfated lead oxide powder that is poured into a non-conductive tube (braided or woven glass or polyethylene) containing a protruding lead alloy rod or spine. Several of these tubes make up the grid structure and electrical connections are made to the terminals by the protruding lead alloy rods. The tubular cathodes and the usual plate anodes are then assembled into elements and these are then placed in a battery container. The cells are filled with electrolyte and the battery is subjected to the formation process. See details on lead-acid batteries, by Doe in Kirk-Othmer: Encyclopedia of Chemical Technology, Volume 3 (1978), page 640–663.

During lead-acid battery formation, active material particles in contact with the grid are formed first and particles further away from the grid are formed later. This tends to reduce the efficiency of formation. An apparent solution to this problem is addition of a conductive material to the active material paste. The additive should be electrochemically stable in the lead-acid system both with respect to oxidation and reduction at the potentials experienced during charge and discharge of the cell, as well as to chemical attack by the sulfuric acid solution. The use of barium metaplumbate and other ceramic perovskite powder and plating additives to the lead-acid battery anode and cathode are reported to enhance the formation of lead-acid batteries. See U.S. Pat. No. 5,045,170 by Bullock and Kao. However, these additives are limited to the lead-acid battery system and require up to a 50 weight percent addition to be effective.

For other battery systems, the cathode materials such as, $MoO_3$, $V_2O_5$, $Ag_2CrO_4$ and $(CF_x)_n$ that are used in primary lithium batteries are typically mixed with carbon, metal or graphite powder to improve the overall cathode electrical conductivity and therefore, the utilization of the cathode material. Depending on the battery design, the current collector is either the cathode material itself or a nickel screen pressed into the cathode material. The current collector for the anode (lithium) is a nickel screen pressed into the lithium metal. The separator between the lithium battery cathode and anode is typically a non-woven polypropylene, Teflon or polyvinyl chloride membrane. The electrolyte for the lithium battery is an organic solvent such as propylene carbonate, dimethyl sulphoxide, dimethylformamide, tetrahydrofuran to which some inorganic salt such as, $LiClO_4$, LiCl, LiBr, $LiAsF_6$ has been added to improve the solution ionic conductivity. Hughes, Hampson and Karunathilaka (J. Power Sources, 12 (1984), pages 83–144)) discuss the enhancement techniques used for improving the cathode electrical conductivity for lithium anode cells. While the addition of the materials to improve the cathode conductivity and utilization are feasible, the amount of additive material required means that much less electrochemical active cathode material that will be available, and in some lithium battery designs, because of volume limitations, that can be critical.

Other battery systems requiring that the cathode have improved conductivity and thereby, improved cathode $(NiOOH/Ni(OH)_2)$ active material utilization are secondary nickel batteries such as, Ni/Cd, Ni/Zn and Ni/MH (metal hydride). The electrolyte for the nickel battery system is usually potassium hydroxide solution and the separator between the anode and cathode is non-woven polypropylene. To enhance the cathode conductivity, graphite is added but this material is not long lasting as it is gradually oxidized to carbon dioxide. In addition to the degradation of the graphite, there is a gradual build-up of carbonate ions which reduces the conductivity of the electrolyte. See discussion on nickel batteries in "Maintenance-Free Batteries" by Berndt.

A sodium-sulfur battery comprises molten sulfur or molten sodium polysulfide as a cathode, molten sodium as an anode, and a non-porous solid electrolyte made of beta alumina that permits only sodium ions to pass. The sulfur or sodium polysulfide in the cathode has an inferior electrical conductivity in itself. The art has attempted to address this problem by adding conductive fibers such as metal fiber or carbon fiber to the molten sulfur or molten sodium polysulfide. For general information, see U.S. Pat. Nos. 3,932,195 and 4,649,022. These types of fibers however, are prone to corrosion in the electrochemical environment of a sodium-sulfur battery. A need therefore continues for sodium-sulfur batteries which employ chemically stable conductive ceramic materials therein.

Another type of electrical energy generating device, as is known in the art, is the fuel cell such as acid fuel cells, molten carbonate fuel cells, solid polymer electrolyte fuel cells and solid oxide fuel cells. A fuel cell is an apparatus for continually producing electric current by electrochemical reaction of a fuel with an oxidizing agent. More specifically, a fuel cell is a galvanic energy conversion device that chemically converts a fuel such as hydrogen or a hydrocarbon and an oxidant that catalytically react at electrodes to produce a DC electrical output. In one type of fuel cell, the cathode material defines passageways for the oxidant and the anode material defines passageways for fuel. An electrolyte separates the cathode material from the anode material. The fuel and oxidant, typically as gases, are continuously passed through the cell passageways for reaction. The essential difference between a fuel cell and a battery is that there is a continuous supply of fuel and oxidant from outside the fuel cell. Fuel cells produce voltage outputs that are less than ideal and decrease with increasing load (current density). Such decreased output is in part due to the ohmic losses within the fuel cell, including electronic impedances through the electrodes, contacts and current collectors. A need therefore exists for fuel cells which have reduced ohmic losses. The graphite current collectors used in phosphoric acid and solid polymer electrolyte fuel cells, to the cathode metal oxides such as, praseodymium oxide, indium oxide used in solid oxide fuel cells and to the nickel oxide cathode used in molten carbonate fuel cells are examples of a need for conductive additives. See generally, "Handbook of Batteries and Fuel Cells", Edited by Linden.

Multilayer surface mount ceramic chip capacitors which store electrical energy are used extensively by the electronics industry on circuit boards. A typical multilayer surface mount chip capacitor is comprised of alternating multilayers of dielectric (ceramics such as $BaTiO_3$) electrodes (metals such as Pd or Pd—Ag). The end caps or terminations of the capacitor are typically a metallic (Ag/Pd) in combination with a conductive glass. This termination is the means of contact to the internal electrodes of the multilayer ceramic capacitor. The development of other electrodes such as nickel and copper to reduce costs and the use of low cost conductive additives to the glass are actively being sought. See generally, Sheppard (American Ceramic Society Bulletin, Vol. 72, pages 45–57, 1993) and Selcuker and Johnson (American Ceramic Society Bulletin, 72, pages 88–93, 1993).

An ultra-capacitor, sometimes referred to as a super capacitor, is a hybrid encompassing performance elements of both capacitors and batteries. Various types of ultracapacitors are shown in "Ultracapacitors, Friendly Competitors and Helpmates for Batteries," A. F. Burke, Idaho National Engineer Laboratory, February 1994. A problem associated with an ultracapacitor is high cost of manufacture.

Sensors, as are known in the art, generate an electrical potential in response to a stimulus. For example, gas sensors such as oxygen sensors generate an electrical potential due to interaction of oxygen with material of the sensor. An example of an oxygen sensor is that described by Takami (Ceramic Bulletin, 67, pages 1956–1960, 1988). In this design, the sensor material, titania ($TiO_2$), is coated on an alumina ($Al_2O_3$) substrate with individual lead connections for the substrate and the titania components. The development of higher electrical conductive titania to improve the oxygen sensor response is an on-going process. Another sensor, humidity, is based upon the electrical conductivity of $MgCr_2O_4$—$TiO_2$ porous ceramics is discussed by Nitta et al. (J. American Ceramic Society, 63, pages 295–300, 1980). For humidity sensing, leads are placed on both sides of the porous a ceramic plaque and the sensor is then placed in the air-moisture stream for resistivity (inverse of electrical conductivity) measurements. The relative humidity value is then related to the measured resistivity value. With this design, the porous ceramic resistivity value, as low as possible, is critical because of the need for a rapid measurement response time (seconds) that can be related to an accurate relative humidity value.

Another type of electrical device, as is known in the art, is a bipolar battery. Such a battery typically comprises an electrode pair constructed such that cathode and anode active materials are disposed on opposite sides of an electrically conductive plate, that is, a bipolar plate. The cells that have this electrode pair are configured such that the cell-to-cell discharge path is comparatively shorter and dispersed over a large cross-sectional area, thus providing lower ohmic resistance and improved power capabilities compared to unipolar batteries such as automobile batteries. The bipolar electrodes are stacked into a multicell battery such that the electrolyte and separators lie between adjacent bipolar plates. The Lead-acid batteries are attractive candidates for bipolar construction because of the high power capabilities, known chemistry, excellent thermal characteristics, safe operation and widespread use. However, such lead-acid batteries with bipolar construction often fail due to the corrosion of the electrically conductive plate when in contact with the active material. A need therefore exists for bipolar batteries which have improved corrosion resistance, low resistivity and reduced weight. For general information on bipolar batteries, see Bullock (J. Electrochemical Society, 142, pages 1726–1731, 1995 and U.S. Pat. No. 5,045,170) and U.S. Pat. No. 4,353,969.

Although the devices of the prior art are capable of generating and storing electrical energy, and acting as oxygen and relative humidity sensors, there is a need for improved materials of construction for reasons of diminished corrosion, higher capacity and/or higher electrical conductivity which overcome the disadvantages of the prior art.

In addition to the previously mentioned materials used in the above applications, there are several U.S. Patents which delineate the electrochemical use of electrically conductive ceramics such as the sub-oxides of titanium which are formed from the reduction of titanium dioxide in hydrogen or carbon monoxide reducing gases at high temperatures (1000° C. or greater). For example, U.S. Pat. No. 5,126,218 discusses the use of $TiO_x$ (where x=1.55 to 1.95) as a support structure (grids, walls, conductive-pin separators), as a conductive paint on battery electrodes and as powder in a plate for the lead-acid battery. A similar discussion occurs in U.S. Pat. No. 4,422,917 which teaches that an electrochemical cell electrode is best made from bulk material where the TiO. has its x vary from 1.67 to 1.85, 1.7 to 1.8, 1.67 to 1.8, and 1.67 to 1.9.

The said mentioned electrode materials are suitable for electrocatalytically active surfaces when it includes material from the platinum group metals, platinum group metal alloys, platinum group metal oxides, lead and lead dioxide. The electrodes are also suitable for metal plating, electrowinning, cathodic protection, bipolar electrodes for chlorine cells, tile construction, and electrochemical synthesis of inorganic and organic compounds.

Oxides of titanium are discussed in U.S. Pat. No. 5,173, 215 which teaches that the ideal shapes for the Magneli phases ($Ti_nO_{2n-1}$ where n is 4 or greater) are particles that have a diameter of about one micron (1 micron (denoted $\mu$) is $10^{-6}$ meter (denoted m)) or more and a surface area of 0.2 $m^2/g$ or less.

The U.S. Pat. No. 5,281,496 delineates the use of the Magneli phase compounds) in powder form for use in electrochemical cells. The use of powder is intended for the electrode structure only.

U.S. Pat. No. 4,931,213 discusses a powder containing the conductive Magneli phase sub-oxides of titanium and a metal such as copper, nickel, platinum, chromium, tantalum, zinc, magnesium, ruthenium, iridium, niobium or vanadium or a mixture of two of more of these metals.

SUMMARY OF THE INVENTION

The invention is directed to solving the problems of the prior art by improving electrochemical devices such as batteries, fuel cells, capacitors, sensors and other electrochemical devices as follows: (1) In batteries for example, there will be an improved discharge rate, increased electrochemically active material utilization, improved charging efficiency, reduced electrical energy during the formation of electrochemically active materials and decreased electrical resistance of the electrochemically active material matrix; (2) In fuel cells, for example, there will be decreased electrical resistance of the current collectors and cathode materials as well as increased electrical chemical efficiency of the reactants; (3) In capacitors, for example, there will be development of less expensive electrodes and conductive glass; (4) In sensors, there will be the development of lower resistive titanium dioxide for oxygen sensors and lower resistive binary compounds containing titanium dioxide for relative humidity sensors; and (5) In other electrochemical devices, for example, there will be the development of more corrosion resistant and current efficient electrodes for electrolysis, electrosynthesis.

As used herein, conductive ceramic materials include conductive ceramic compositions such as solids, plaques, sheets (solid and porous), fibers, powders, chips and substrates (grids, electrodes, current collectors, separators, foam, honeycomb, complex shapes for use in components such as grids made by known methods such as weaving, knitting, braiding, felting, forming into paper-like materials, extrusion, tape casting or slip casting) made from conductive ceramic compositions having metal containing additives and metallic coatings thereon, or made from non-conductive ceramic compositions having metal containing additives and metallic coatings dispersed thereon.

The electrically conductive ceramic materials for use in the invention, when in the form of fibers, powders, chips or substrate, are inert, light weight, have high surface area per unit weight, have suitable electrical conductivity, as well as high corrosion resistance. Typically, the electrically conductive ceramic fibers, powders, chips or substrate herein have an electrical conductivity of 0.1 (ohm-cm)$^{-1}$ or more.

Electrically conductive ceramic fibers, powder, chips or substrate useful in the invention include an electrically conductive or non-electrically conductive ceramic matrix, preferably with a metal containing additive and/or metallic coating. Ceramic matrix materials which may be employed include, the oxides of the metals titanium, and vanadium and the oxides of zirconium, and aluminum. The reduced oxides of titanium and vanadium have a certain amount of intrinsic electrical conductivity and the oxides of zirconium and aluminum are intrinsically insulators. All mentioned ceramic oxides have different chemical and physical attributes and these materials cover a wide range of applicability. Either ceramic metal oxide can have the electrical conductivity increased by the addition or plating or coating or deposition of singly or a mixture thereof of metallic d-block transition elements (Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au), Lanthanides (Ce, Pr, Nd, Pm, Sm, Eu, Gd, Tb, Dy, Ho, Tm, Yb, Lu) and/or by the addition or plating or coating or deposition singly or a mixture thereof of selected main-group elements (B, Al, Ga, In, Tl, Si, Ge, Sn, Pb, As, Sb, Bi, Se, Te) and/or the oxides, halides, carbides, nitrides and borides of the aforementioned elements. Chemical reduction processes for the selected mixtures reduce the ceramic to its final electrically conductivity form. Similarly, chemical oxidation processes may be used to form superstoichiometric titanium oxide in which the atomic oxygen to titanium ratio is slightly above 2.

The electrically conductive ceramic materials, fibers, powders, and chips mentioned in this invention can be used to enhance the electrical conductivity and thereby, the utilization of the electrochemically active materials in cathode for the following primary and secondary battery systems: lithium batteries, zinc air batteries, aluminum air batteries, alkaline batteries, Leclanche batteries, nickel batteries, lead-acid batteries, and sodium-sulfur. The electrically conductive ceramic substrate as mentioned in this invention would be suitable for fuel cell electrodes and current collectors and bipolar plate batteries. In addition, the electrically conductive ceramic materials, fibers, powders, chips and substrate according to this invention would be suitable for oxygen and humidity sensors as well as multilayer chip capacitors and ultracapacitors. The electrode made from this invention can also be useful as an anode or cathode, whichever is applicable, in electrochemical devices including batteries and in an electrolytic cell generating ozone, chlorine gas, or sodium, recovering metals from wastewater and purification of metals by electrolysis.

The electrically conductive ceramic materials, fibers, powders, chips and/or substrates therein may impart superior battery discharge and charging performance, battery cycle life, battery charge retention, battery weight reduction, deep battery discharge recovery, as well as battery structure vibration and shock resistance. Batteries such as lead-acid batteries which employ electrically conductive ceramic materials, fiber, powder, chips and/or substrates therein advantageously may require reduced electrical energy during formation. Fuel cells utilizing electrically conductive ceramic materials, fibers, powder and/or substrate for the current collector and the electrodes may have longer operating life because of superior corrosion resistance and enhanced performance because of superior electrical conductivity. The use of electrically conductive ceramic materials, fibers, powder, chips and substrates from this invention may impart low cost manufacturing, superior electrical resistivity performance in oxygen and humidity sensors, multilayer chip capacitors, and ultracapacitors.

Other advantages of the present invention will become apparent as a fuller understanding of the invention is gained from the detailed description to follow.

DETAILED DESCRIPTION OF THE INVENTION

In accordance with the invention, electrically conductive ceramic materials, fibers, powders, chips and substrates are either added to components or used to construct components for electrochemical devices such as batteries, fuel cells, capacitors, sensors, and other electrochemical devices. The type of conductive ceramic material used depends on the type of chemical, electropotential and electrochemical environments to which the conductive ceramic materials will be subjected.

Preferred Ceramic Materials

The preferred starting materials for electrically conductive sub-oxide titanium ceramics according to this invention are the following: $TiO_2$ (preferably rutile), Ti, $Ti_2O_3$, $Ti_3O_5$, metal (chromium, copper, nickel, platinum, tantalum, zinc, magnesium, ruthenium, iridium, niobium, and vanadium or a mixture of two or more of the aforementioned metals)-containing intercalated graphite, graphite and carbon. Also possible, the addition of singly or a mixture thereof metallic d-block transition elements (Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au), Lanthanides (Ce, Pr, Nd, Pm, Sm, Eu, Gd, Tb, Dy, Ho, Tm, Yb, Lu) and by the addition singly or a mixture thereof selected main-group elements (B, Al, In, Tl, Si, Ge, Sn, Pb, As, Sb, Bi, Se, Te) and/or the oxides, halides, carbides, nitrides and borides of the aforementioned elements. All materials used should have a purity level that excludes deleterious substances for this process as well as the projected use.

The preferred starting materials for electrically conductive sub-oxide vanadium ceramics according to this invention are the following: $V_2O_5$, $V_2O_3$, $VO_2$, V, metal (chromium, copper, nickel, platinum, tantalum, zinc, magnesium, ruthenium, iridium, niobium, and vanadium or a mixture of two or more of the aforementioned metals)-containing intercalated graphite, graphite, and carbon. Also possible, the addition of singly or a mixture thereof metallic d-block transition elements (Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au), Lanthanides (Ce, Pr, Nd, Pm, Sm, Eu, Gd, Tb, Dy, Ho, Tm, Yb, Lu) and by the addition singly or a mixture thereof selected main-group elements (B, Al, In, Tl, Si, Ge, Sn, Pb, As, Sb, Bi, Se, Te) and/or the oxides, halides, carbides, nitrides and borides of the aforementioned elements. All materials used should have a purity level that excludes deleterious substances for this process as well as the projected use.

The teachings of U.S. Pat. No. 4,422,917 state that the conductive materials of choice for the sub-oxides of titanium should consistent essentially of $Ti_4O_7$ and $Ti_5O_9$ in order to maximize the conductivity. This concept was further extended by the teachings of U.S. Pat. No. 5,173,215 which stated that it is more proper to speak of the appropriate conductive sub-oxides of titanium as Magneli phases with the general formula $Ti_nO_{2n-1}$ where n=4 or greater. TiO is never considered in either patent as an important component because of reported instability and less than desirable resistance to chemical attack. For the sub-oxides of titanium, $Ti_4O_7$ has been measured with a conductivity value of 1585 $(ohm-cm)^{-1}$, $Ti_5O_9$ has been measured with an electrical conductivity value of 553 $(ohm-cm)^{-1}$, and the electrical conductivity of TiO has been measured to be 3060 $(ohm-cm)^{-1}$. This TiO value is almost twice that of the Magneli phase $Ti_4O_7$. With this invention, the TiO is considered to be an important component of the over-all electrical conductivity. Through judicious selection of the sub-oxide titanium reduction process conditions to make a well-defined TiO structure and with the aforementioned metal compound additions to the starting materials for the titanium oxides, a synergism effect occurs during processing and results in a stable and chemical resistance TiO structure within the ceramic matrix of the sub-oxides of titanium. Separately, the '917 and '215 patents do not teach super-oxides oxides of titanium (superstoichiometric "$TiO_2$") in which the atomic oxygen to titanium ratio is slightly above 2.

A preferred composition of matter for the electrically conductive ceramic material, fibers, powders, chips and substrates of the sub-oxides of titanium with additives is as follows:

| Constituent | Weight Percent (%) |
| --- | --- |
| $Ti_nO_{2n-1}$ where n = 4 or greater | 80–90 |
| TiO | 0–10 |
| $Ti_2O_3$ and $Ti_3O_5$ | >>>1 |

M oxides, and/or borides, and/or carbides, 0–10 and/or nitrides and/or free metal, wherein the sum of the above percentages is less than or equal to 100% and wherein M=Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Ce, Pr, Nd, Pm, Sm, Eu, Gd, Tb, Dy, Ho, Tm, Yb, Lu, B, Al, Tl, Si, Ge, Sn, Pb, As, Sb, Bi, Se, Te.

Another composition of matter for the electrically conductive ceramic material, fibers, powders, chips and substrates of the sub-oxides of titanium, if there were no metal compound additives, and if the starting materials were only $TiO_2$ (preferably rutile) and metal-containing intercalated graphite, is:

| Constituent | Weight Percent (%) |
| --- | --- |
| $Ti_nO_{2n-1}$ where n = 4 or greater | 90–100 |
| M oxides and/or free metal Where M = Cr, Cu, Ni, Pt, Ta, Zn, Mg, Ru, Ir, Nb, V. | 0–10 |

A preferred composition of matter for the electrically conductive ceramic material, fibers, powders, chips and substrates of the sub-oxides of vanadium with additives is as follows:

| Constituent | Weight Percent (%) |
| --- | --- |
| VOx (x = 1 to 2.5) | 50–90 |
| M oxides, and/or borides, and/or carbides, and/or nitrides and/or free metal | 10–50 | wherein the sum of the above-noted weight percents is less than or equal to 100 and wherein M=Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Ce, Pr, Nd, Pm, Sm, Eu, Gd, Tb, Dy, Ho, Tm, Yb, Lu, b, Al, Tl, Si, Ge, Sn, Pb, As, Sb, Bi, Se, Te.

Another composition of matter for the electrically conductive ceramic material, fibers, powders, chips, and substrates of the sub-oxides of vanadium, if there were no metal compound additives, and if the starting materials were only $V_2O_3$ and metal-containing intercalated graphite, is:

| Constituent | Weight Percent (%) |
| --- | --- |
| VOx (x = 1 to 2.5) | 90–100 |

M oxides and/or free metal Where M=Cr, Cu, Ni, Pt, Ta, Zn, Mg, Ru, Ir, Nb, V either singly or mixtures thereof. 0–10

For electrically conductive ceramics made by plating, coatings, and deposition of metals and/or conductive ceramic, the composition of matters are as follows:

| Constituent | Weight Percent (%) |
| --- | --- |
| $Al_2O_3$ | 85–90 |
| M oxides and/or free metal | 5–15 |

Where M=Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Ce, Pr, Nd, Pm, Sm, Eu, Gd, Tb, Dy, Ho, Tm, Yb, Lu, In, Tl, Sn, Pb, Sb, Bi, Se, Te either singly or mixtures thereof.

| Constituent | Weight Percent (%) |
| --- | --- |
| $ZrO_2$ | 85–95 |
| M oxides and/or free metal | 5–15 |

Where M=Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Ce, Pr, Nd, Pm, Sm, Eu, Gd, Tb, Dy, Ho, Tm, Yb, Lu, B, Al, Tl, Si, Ge, Sn, Pb, As, Sb, Bi, Se, Te singly or mixtures thereof.

| Constituent | Weight Percent (%) |
| --- | --- |
| $Al_2O_3$ | 40–48 |
| $ZrO_2$ | 40–48 |
| M oxides and/or free metal | 4–20 |

Where M=Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Ce, Pr, Nd, Pm, Sm, Eu, Gd, Tb, Dy, Ho, Tm, Yb, Lu, B, Al, Tl, Si, Ge, Sn, Pb, As, Sb, Bi, Se, Te, singly or mixtures thereof.

Examples of applications in which the conductive ceramic materials of the present invention can be used are the following: (1) the use of fibers, powder, or chips in the cathode active materials of the lead-acid, lithium, nickel, Zn, and metal air batteries; (2) the use of fibers, powder or chips to make substrates for use as current collectors and electrodes and the use of fiber, powder, and chips in electrodes for fuel cells; (3) the use of fibers, powders or chips to make substrates for use as electrodes for electrosynthesis, cathodic protection, electrocatalysis, electrolysis, and metal recovery; (4) the use of fibers, powder and chips to make substrates which can act as bipolar electrode construction for lead-acid batteries; (5) the use fibers, powders and chips to make substrates for use as electrodes and the use of fibers and powder in glass for capacitors; (6) the use of fibers, powders, chips to make a substrate which can act as an electrode in sensors. If so desired, the electrodes fabricated from this invention can be plated, coated, or deposited with metals to enhance their electrochemical properties.

Forming of Shaped Materials

Electrically conductive ceramic materials and fibers can be formed from the oxides of titanium or vanadium material that may or may not have metal containing additives and "in situ" reduction agents dispersed therein. Shaping may be done on either electrically-conducting or electrically non-conducting materials. In the latter case, activation of the oxide to a conducting state is done on the shaped material. For titanium or vanadium materials, this activation may be done by chemical reduction. Normally non-conducting oxides such as $Al_2O_3$ or $ZrO_2$ are made conducting by plating of conducting materials, as is discussed below. In the following, various possible shapes are discussed.

Fibers

These ceramic matrixes are made into fibers by known fiber-making processes such as the viscous suspension spinning process (Cass, Ceramic Bulletin, Vol. 70, pages 424–429, 1991) with and without metal-containing intercalated graphite, or by the sol-gel process (Klein, Sol-Gel Technology for Thin Films, Fibers, Preforms, Electronics, and Speciality Shapes, Noyes Publications, pages 154–161), and or by either the slurry or solution extrusion process (Schwartz, Handbook of Structural Ceramics, page 4.55, 1992). The procedures for sample slurry or slip preparation, drawing or extruding material as well as the appropriate drying to remove water, heating to burn off organics, and sintering are discussed in detail in these articles. After the sintering operation at 1000–2000° C., these ceramic fiber materials are made electrically conductive through reduction in a furnace at 1000–2000° C. whose atmosphere is either hydrogen, carbon monoxide or mixtures of these gases. In addition, depending on the metal containing additives in the starting ceramic matrix, "in situ" reduction and/or decomposition processes occur during the drying, heating, sintering and reduction cycles via the use of "in situ" reduction materials such as carbon, metal-containing intercalated graphite, graphite, and metal powders incorporated either singly or mixtures thereof into the ceramic matrix. Once after the reduction process has ended, the fibers are cooled in a dry atmosphere and stored until use. At this point, the electrically conductive ceramic fibers are now ready for use. All initial starting materials are in powdery form and the ceramic matrix powders have been mixed to obtain a homogeneous mixture of materials before preparing the slurry or slip prior to the fiber making process. For enhanced ceramic matrix reactivity, it is preferred that the particle size of the powders be in the range of 40 to 150 microns. Preferably, the electrically conductive ceramic fibers have an aspect ratio of greater than 1 and an electrical conductivity value of 0.1 $(ohm-cm)^{-1}$ or greater.

Non-electrically conductive ceramic fibers are formed from alumina ($Al_2O_3$) or zirconia ($Zro_2$) or zirconia-alumina material with no metal containing additives or "in situ" reduction agents. These ceramic matrixes are then made into fibers by the previously mentioned viscous suspension spinning process, or by the sol-gel process, and/or by either the slurry or solution process. The sample slurry or slip preparation, drawing or extruding material as well as the appropriate drying to remove water, heating to burn off organics, sintering and storage conditions are the same as discussed for the electrically conductive ceramics matrixes. All the initial starting materials are in powdered form and are mixed to obtain a homogeneous mixture before slurry or slip preparation prior to the fiber-making process. It is preferred that the particle size of the starting powders be in the range of 40 to 150 microns. The ceramic fibers so obtained are considered to be insulators or non-electrically conductive.

Details of Spinning and Sintering to Make Fibers

In forming the conductive ceramic fibers by solution spinning and sintering, a suspension of particles of ceramic material in a solution of destructible carrier dissolved in a solvent is prepared. The fibers then are wet or dry spun from the suspension, dried and fired to drive off the carrier and sinter the fiber. Preferably, the particle size is 5 microns or less, and polyvinyl alcohol/water system may be used as a carrier/solvent.

After the aforementioned components have been mixed at a certain compositional ratio characteristic of the desired ceramic material, the resulting mixture is dispersed or dissolved in a polymer compound solution. Thus, a spinning solution is obtained. Optionally, the aforementioned mixture may be roasted at an elevated temperature such as 900–1, 100° C. for about 1–5 hours before it is dispersed or dissolved in the polymer compound-containing solution.

Examples of polymer compounds which may be used in the present invention include polyacrylonitrile, polyethylene, polypropylene, polyamide, polyester, polyvinyl alcohol polymers ("PVA"), cellulose derivatives e.g., methyl cellulose, hydroxyethyl cellulose, hydroxyethylmethyl cellulose, etc.), polyvinylpyrrolidone, polyacrylamide, polyethylene glycol, etc.

Generally, the degree of saponification of the aforementioned PVA polymer may be 70–100 mol %, more preferably 85–100 mol %, most preferably 95–100 mol %. The degree of polymerization of the polymer may be 500–20,000, preferably 1,000–15,000.

Polyvinyl alcohol polymers which may be employed include ordinary unmodified polyvinyl alcohol as well as modified polyvinyl alcohols can also be used. As modified polyvinyl alcohols, a saponified copolymer of vinyl acetate and a copolymerizable comonomer may be used. Examples of these comonomers include vinyl esters such as vinyl propionate, vinyl stearate, vinyl benzoate, vinyl saturated branched fatty acid salts, etc., unsaturated monocarboxylic acids such as acrylic acid, methacrylic acid, crontonic acid, etc. and their alkyl esters, unsaturated polycarboxylic acids such as maleic acid, maleic anhydride, fumaric acid, itaconic acid, etc. and their partial esters or total esters, acrylonitrile, methacrylonitrile, acrylamide, methacrylamide, olefinsulfonic acids such as ethylenesulfonic acid, allylsulfonic acid, methacrylsulfonic acid, etc. and their salts, α-olefins such as ethylene, propylene, butene, α-octene, α-dodecene, α-octadecene, etc., vinyl ether, silane-containing monomers, etc. The concentrations of the aforementioned comonomers with respect to the copolymer may be less than 20 mol %.

As other modified polyvinyl alcohols, products obtained by modifying a vinyl acetate homopolymer or the aforementioned saponified copolymer can be used. Examples of modifying reactions include acetylation, urethanation, phosphoric acid esterification, sulfuric acid esterification, sulfonic acid esterification, etc.

A useful spinning solution for forming fibers for use in the present invention may be obtained by dispersing or dissolving a ceramic material or a substance which can be converted to a conductive ceramic material by heat treatment (preferably a fiber) in the aforementioned polymer compound solution.

As the solvents of the polymer compound solution, water or other solvents which can solubilize polymer compounds may used.

Examples of solvents other than water include alcohols, ketones, ethers, aromatic compounds, amides, amines, sulfones, etc. These solvents may be mixed with water at certain ratios.

Polyvinyl alcohol polymers may be employed as the polymer compound. The solvents such as water, dimethyl sulfoxide, glycerin, ethylene glycol, diethylene glycol, N-methylpyrrolidone, dimethylformamide, and their mixtures can be advantageously used.

In the present invention, dry spinning may be employed to produce fibers for use in the claimed invention. As is known in the art, dry spinning entails spinning a solution drawn into air or another gas from a die or in a die-free state. The spinning draft typically is about 0.1–2.0. Subsequently, the resulting precursor fiber is heat-treated. The precursor fiber may be stretched before heat treatment. In a typical heat treatment, the fiber is baked for several minutes to several hours in a desired atmosphere to achieve a desired level of conductivity in the fiber. Then, the fiber is cooled.

There are no special restrictions on the diameter of the conductive fiber obtained. Typically, the diameter is about 200 µm or less, preferably 100 µm or less, more preferably 50 µm or less, most preferably 20 µm or less. There are no special restrictions on the lower limit.

In the aforementioned spinning solution, the weight ratio of the polymer compound with respect to the conductive ceramic material or substance which can be converted to conductive ceramic material by heat treatment is about 15 wt % or less and 3 wt % or more, preferably 10 wt % or less and 3 wt % or more, respectively.

When the aforementioned spinning solution is prepared, a dispersant for the conductive ceramic material or substance which can be converted to conductive ceramic material by heat treatment can also be used. Examples of dispersants include anionic emulsifiers, nonionic emulsifiers, and cationic emulsifiers such as polyoxyethylene (10) octylphenyl ether and sodium dodecylsulfate. Moreover, polyacrylic acid and its salts, polystyrene, neutralized maleic anhydride copolymers, maleic anhydride-isobutene copolymer, and other polymer dispersion stabilizers may be used.

There are no special restrictions on the total solid content of the aforementioned spinning solution. Generally speaking, however, the solid content is about 20–70 wt %. After the spinning solution has been dry-spun, it is dried. Thus, a continuous precursor fiber is obtained.

Sintering of mixtures of ceramic powders, optionally with metals, may also be employed to manufacture conductive ceramic fibers. In the manufacture of conductive ceramic materials by sintering, ceramic matrix material and metal additive are combined with a binder, and subjected to elevated temperatures in a selected atmosphere. The specific temperatures and the atmosphere depend on the composition to be sintered. See for example, U.S. Pat. No. 4,931,213 directed to sintering of substoichiometric $TiO_2$ having Cu therein. Metal containing additives which may be incorporated into the ceramic matrix by sintering have a relatively high melting point and a low vapor pressure to minimize loss of the metal containing additive. Metals which may be included in ceramic matrices to provide conductive ceramic material for use in the invention include Cu, Ni, Co, Ag, Pt, Ta, Zn, Mg, Ru, Ir, Nb, V, Sn, SnO, $SnO_2$, Pb, and alloys thereof, as well as other metals which are stable in the electrochemical system of the device. For example, conductive ceramic fibers formed of non-stoichiometric $TiO_2$ such as $Ti_4O_7$ and/or $Ti_5O_9$ matrix having Cu therein may be employed.

Coating of Fibers

The conductive ceramic fibers employed in the invention may be coated with a metal such as Cu, Ni, Co, Ag, Pt, Ta, Zn, Mg, Ru, Ir, Nb, V, W, Sn, SnO, $SnO_2$, Pb, as well as alloys thereof. Choice of metal coating on the conductive ceramic materials and fibers depends on the active material, and/or the component in which the coated conductive ceramic fibers are employed. For example, in lead-acid batteries, especially useful metal coatings include Sn—Pb alloys wherein Sn may be up to 90%, remainder Pb in thicknesses of about 0.1–1.0 mil on a conductive ceramic fiber material of either $Ti_4O_7$ and/or $Ti_5O_9$.

In alkaline batteries such as NiCd, NiMH, Ni—Fe, Ni—Zn and $MnO_2$—Zn, especially useful metal coatings include Ni, Ag and Cu in thicknesses of about 0.1–1.0 mil on a conductive ceramic fiber matrix of substoichiometric $TiO_2$ such as $Ti_4O_7$ and/or $Ti_5O_9$ intercalated with Cu.

In Li batteries such as Li—$MnO_2$, especially useful coatings include Ni, Ag, Cu, Li, and $SnO_2$ in thicknesses of about 0.1–1.0 mil on a conductive ceramic fiber matrix of substoichiometric $TiO_2$ such as $Ti_4O_7$ and/or $Ti_5O_9$.

In Ni batteries such as NiCd, and NiMH, especially useful metal coatings include Co, Ni, NiCo alloys on a ceramic matrix of $Ti_4O_7$ and/or $Ti_5O_9$, each of which optionally may have Cu therein. In sensors such as gas sensors, especially useful coatings include $SnO_2$ on, for example, $Ti_4O_7$ and/or $Ti_5O_9$ ceramic matrix, each of which may have Cu therein.

In capacitors such as $TiO_2$ on $Ti_4O_7$ and/or $Ti_5O_9$, carbon or graphite on $Ti_4O_7$ and/or $Ti_5O_9$, especially useful coatings include Cu on a ceramic matrix of $Ti_4O_7$ and/or $Ti_5O_9$.

The specific choice of conductive ceramic matrix material and metal containing additive therein, as well as the composition of metal coating thereon, may be determined by the art skilled in accordance with the specific electrochemical system of the device in which the fibers or. other conductive ceramic materials are employed. The primary requirements are that the fiber or other conductive ceramic materials and metal coating be compatible with the electrochemistry of the battery. Accordingly, the choice of metal coating on the conductive ceramic fiber or material will vary depending on the electrochemistry of the device, the adherence of the metal coating to the ceramic matrix of the conductive ceramic fiber or material. Generally, the metal coating should not be attacked by the electrolyte in the device.

The thickness of the metal coating on the conductive ceramic fiber or other conductive ceramic materials similarly depends on the device in which the conductive ceramic fibers or other conductive ceramic materials are employed. Generally, the thickness of the applied metal coating should be sufficient to provide a pore free coating. For example, lead-acid batteries which employ conductive ceramic fibers formed of $Ti_4O_7$ and/or $Ti_5O_9$ having $SnO_2$ therein may have about a 0.001 inch thick coating of Pb, Sn, or Sb thereon. Similarly, alkaline batteries such as NiCd which employ conductive ceramic fibers formed of a $Ti_4O_7$ and/or $Ti_5O_9$ matrix having Ni, Co, Cn, or NiCo alloys therein may have a 0.001 inch thick coating of Ni thereon. In Li batteries such as $LiMnO_2$ which employ conductive ceramic fibers formed of a $Ti_4O_7$ and/or $Ti_5O_9$ matrix having Li, Ni or Mn therein may have about a 0.001 inch thick coating of Cu thereon. In Ni batteries which employ conductive ceramic fibers formed of a $Ti_4O_7$ and/or $Ti_5O_9$ matrix having Ni or Co therein may have about a 0.001 inch thick coating of Co thereon.

Well known methods such as chemical vapor deposition, plasma spraying, laser deposition, and solution dipping may be employed to apply a metal coating onto the conductive ceramic fibers or other conductive ceramic materials, provided that that method does not attack the underlying substrate. For example, tin, lead and alloys thereof can be applied by immersion dipping to provide a coating thickness on the order of microns to mils.

In a further aspect of the invention, the conductive ceramic fibers or other conductive ceramic materials may be coated with alternating metal layers of differing compositions. Useful combinations of conductive ceramic fibers or other conductive ceramic materials having metal coatings thereon are shown in Table 1.

TABLE 1

| CERAMIC MATRIX | Metal containing additive dispersed in ceramic matrix | FIRST METAL COATING | SECOND METAL COATING |
|---|---|---|---|
| $Ti_4O_7$ | Cu | Cu | NONE |
| $Ti_4O_7$ | Sn | Sn | NONE |
| $Ti_4O_7$ | Pb | Pb | NONE |
| $Ti_4O_7$ | Cu | Sn | Pb |
| $Ti_4O_7$ | Sn | Pb | NONE |
| $Ti_4O_7$ | Ag | Sn-Pb alloy | — |
| $Ti_4O_7$ | Sb | Pb | — |
| $Ti_4O_7$ | W | — | — |
| $Ti_4O_7$ | Ni | Ni | Co |
| $Ti_4O_7$ | Co | Ni | — |
| $Ti_4O_7$ | Ni-Co | Ni-Co | Ni |
| $Ti_4O_7$ | Li | Cu | — |
| $Ti_4O_7$ | Zn | Cu | |
| $Ti_4O_7$ | Pb-Sn | Pb-Sn | |
| $Ti_4O_7$ | SnO2 | Pb | |
| $Ti_5O_9$ | Cu | Cu | NONE |
| $Ti_5O_9$ | Sn | Sn | NONE |
| $Ti_5O_9$ | Pb | Pb | NONE |
| $Ti_5O_9$ | Cu | Sn | Pb |
| $Ti_5O_9$ | Sn | Pb | NONE |
| $Ti_5O_9$ | Ag | Sn-Pb alloy | — |
| $Ti_5O_9$ | Sb | Pb | — |
| $Ti_5O_9$ | W | — | — |
| $Ti_5O_9$ | Ni | Ni | Co |
| $Ti_5O_9$ | Co | Ni | — |
| $Ti_5O_9$ | Ni-Co | Ni-Co | Ni |
| $Ti_5O_9$ | Li | Cu | — |
| $Ti_5O_9$ | Zn | Cu | |
| $Ti_5O_9$ | Pb-Sn | Pb-Sn | |
| $Ti_5O_9$ | SnO2 | Pb | |
| SiC | Li | Cu | |
| ZrB | Li | Cu | |

Active pastes which employ conductive ceramic fibers or other conductive ceramic materials therein typically have about 0.1–30% of the active paste, preferably about 5–20%, as conductive ceramic fibers depending on the conductivity of the conductive ceramic fiber composition. In an active paste, the size of the fibers is sufficient to provide uniform distribution of the ceramic fiber material throughout the paste. Useful sizes of conductive ceramic fibers may vary from about 2–10 microns diameter.

Examples of components in which conductive ceramic fibers or other conductive ceramic materials may be employed include the grids of electrodes for batteries. The conductive ceramic fibers may be present in a grid in an amount of about 80 to 100% by weight of the grid.

In capacitors such as double layer capacitors and ultracapacitors, materials and components which may employ conductive ceramic fibers or other conductive ceramic materials such as $Ti_4O_7$ and $Ti_5O_9$ wherein the fibers are present in amounts of about 30 to 100% based on the total weight of the plates of the capacitor.

In fuel cells, materials and components which may employ conductive ceramic fibers or other conductive ceramic materials and molded products such as electrodes formed of those fibers or other conductive ceramic materials include $H_2$ and $O_2$ electrodes.

In sensors such as $O_2$ gas or organic vapor sensors, materials and components which may employ conductive ceramic fibers or other conductive ceramic materials include electrodes.

In bipolar batteries such as lead-acid bipolar batteries, materials and components which may employ conductive ceramic fibers or other conductive ceramic materials include for example, the active material.

Conductive ceramic fibers or other conductive ceramic materials may be formed into complex shapes suitable for use in components such as grids by known methods such as weaving, knitting, braiding, extrusion, and slip casting. The conductive ceramic fibers or other conductive ceramic materials may be formed into porous paper-like materials by known methods. The choice of method depends on the porosity and strength desired in the grid. For example, a grid formed by felting of a liquid slurry of conductive ceramic fibers has a surface area greater than that obtainable by processes such as weaving.

When forming the components by extrusion, a blend of conductive ceramic precursor material and a binder is formed by mixing. The amounts of conductive ceramic precursor material and binder may vary within wide limits depending on the shape to be extruded as well as the specific ceramic material and binder compositions. Useful binder compositions include those commonly employed in the manufacture of extruded ceramic products. Examples of useful binders include organic binders such as polyethylene, polypropylene, stearates, celluloses such as hydroxy propyl cellulose, polyesters and the like. Typically, greater amounts of binder materials are employed when forming intricately shaped articles. The specific amounts and composition of binder for use with a specific conductive ceramic precursor material to provide a blend suitable for extrusion can readily be determined by those skilled in the art. The extruded product then is dried and fired to produce the desired component such as a plaque or a bipolar electrode.

In slip casting, as is generally known in the art, a slurry of a conductive ceramic precursor material and a liquid vehicle such as water, optionally with an organic binder and surfactants, is cast into a mold to provide the desired shaped article. The specific amounts of ceramic material, organic binder and liquid vehicle can be varied depending on the density desired in the cast product. The resulting cast product is dried and fired by conventional techniques known in the art.

Felting of conductive ceramic fibers or other conductive ceramic materials also may be employed to produce components such as grids for use in electrochemical devices such as batteries. Felting can be performed as shown in the John Badger patent directed to glass mat separators. Green fibers, as well as certain sintered fibers, of the ceramic materials may be employed in well known weaving processes to produce components such as grids which then are fired for use in electrochemical devices such as batteries.

Fiber Requirements

The conductive ceramic fibers for use in the invention have a diameter and a length consistent with the processing requirements of the paste or other component in which the conductive ceramic fiber is to be employed. Generally, preferred fibers have lengths of 10 to 10,000$\mu$ and length to diameter ratios of 1 to 100. Typically, when conductive ceramic fibers are employed in active pastes, the fibers are about 0.125 inches (3,175$\mu$) to 0.250 inches (6,350$\mu$) long and about 0.002 to 0.007 inches diameter. The fibers, moreover, should be capable of withstanding substantial levels of shear stress. The fibers are mixed into the active material paste by conventional mixers.

The grid for use in an electrode of a device such as a battery or fuel cell may include varying amounts of ceramic fibers or other conductive device depending on the type of device. For example, in a lead acid battery, the current collector may be formed of about fifty percent, up to one hundred percent of conductive ceramic fiber material such as $Ti_4O_7$ or $Ti_5O_9$ having therein an oxide which is conductive, stable to sulfuric acid and capable of nucleating $PbO_2$. Such oxides include $SnO_2$, $WO_3$, (TiO and $Ti_4O_7$ and/or $Ti_4O_9$). Similarly, in alkaline batteries such as NiCd, about 0.1–20% conductive ceramic fibers of (TiO and ($Ti_4O_7$) and/or $Ti_4O_7$) having Ni therein may be employed.

When the ceramic fibers are formed into a grid by deposition of the fibers from a liquid slurry, the diameter of the fibers may be about 0.002–0.007 inches and have a length of about 0.125 to about 0.250 inches. Generally, the conductive ceramic fibers should be long enough to yield intersecting joints and/or span the width of the mesh size of a grid to yield a conductive pathway. Specific fiber diameters and lengths can therefore be determined by the art skilled for a specific application for a given fiber composition.

Conductive ceramic fibers may be mixed with active materials such as PbO or $PbSO_4$ to provide improved active material pastes. The conductive ceramic fibers are uniformly distributed throughout the active material paste to provide low resistance paths for flow of electrons between the active material particles and the grid. These low resistance paths may function to reduce the internal resistance of the device in which the active material is employed, especially at low states of charge.

Conductive ceramic fibers or other conductive ceramic materials may be employed in various devices such as batteries, fuel cells, capacitors, and sensors. Batteries may be classified according to the shape of the electrodes. These classifications include paste type electrodes and tubular electrodes. Paste type electrodes have a grid of lead or lead alloy, or a grid formed of woven, knitted, or braided conductive ceramic fibers. Tubular electrodes are made by inserting a cylindrical tube of braided fibers such as glass fibers and polyester fibers around a grid, and then filling the tube with active material. Tubular type electrodes typically are employed as positive electrodes, whereas paste type electrodes are typically positive or negative electrodes. In accordance with the invention, it is contemplated that conductive ceramic fibers or other conductive ceramic materials may be employed in paste and tubular electrodes.

The conductive ceramic fibers or other conductive ceramic materials may be admixed with additional fibers and the resulting blend employed in the active paste and current collector of a battery. The amount of additional fiber in the paste or current collector may vary depending on the physical properties desired. Useful blends are contemplated to include $Ti_4O_7$ and/or $Ti_5O_9$ having $SnO_2$, Cu, Ni, Co, and the like therein with any of carbon fibers, nickel fibers, stainless steel fibers, olefin fibers such as polyethylene, polypropylene, cellulosic fiber, polyesters such as Dacron, and composite fibers such as lead-coated glass fibers. The amount of additional fibers may vary from about 1 to 30% based on the total weight of active material. These additional fibers may be employed to impart additional mechanical strength and corrosion resistance to components formed of the conductive ceramic fibers. Examples of useful blends are given in Table II.

TABLE II

| Example No. | Ceramic Conductive Fiber % | Metal Fiber % | Olefin Fiber % |
|---|---|---|---|
| 1 | $Ti_4O_7$[1] 30–70% | Ni 60–20% | Polypropylene 10% |
| 2 | $Ti_5O_9$[1] 30–70% | Stainless Steel 60–70% | Polypropylene 10–20% |
| 3 | $SnO_2$ 90% | — | Polypropylene 10% |
| 4 | $Ti_4O_7$ 90% | — | Polypropylene 10% |
| 5 | $Ti_4O_7$ 50–90% | — | Polyester 10–50% |

[1]$Ti_4O_7$ intercalated with Cu therein.
[2]$Ti_5O_9$ intercalated with Nb therein.

The conductive ceramic fibers or other conductive ceramic material employed in the invention typically have conductivity sufficient to provide an increase in conductivity of the active material but yet are sufficiently porous and provide enhanced electrochemical utilization of the active material. The active material paste to which the conductive ceramic fibers are added may influence the amount of conductive ceramic fibers employed therein. For instance, in a lead-acid battery where the active paste material of the cathode is $PbO_2$ having about 5–10% conductive ceramic fiber if $Ti_4O_7$, and/or $Ti_5O_9$ matrix, having about 0.5–1.8% metal containing $SnO_2$ therein may be used in the cathode. In alkaline batteries such as Zn—$MnO_2$ wherein the less conductive $MnO_2$ material is used as the active paste material, about 1– 30% conductive ceramic fiber of matrix of $Ti_4O_7$ and/or $Ti_5O_9$ having Cu therein may be employed in the active material. In lithium containing batteries such as Li—$MnO_2$, about 1–10% conductive ceramic fiber or other conductive ceramic materials of matrix $Ti_4O_7$ and/or $Ti_5O_9$ having Cu therein may be employed. In nickel containing batteries such as NiMH, about 1–10% conductive ceramic fiber of matrix $Ti_4O_7$ and/or $Ti_5O_9$ having Co therein may be employed. Typically, conductive ceramic fibers may be used as the additive in the active material in amounts of about 0.1% to 40% by weight of active material.

The diameter and length of the conductive ceramic fiber for use in devices such as batteries, fuel cells, sensors, and capacitors may vary according to the material and component to be formed therefrom, as well as the conductivity desired in the component or paste material in which the fiber is to be employed. The method used to make the specific material or component in which the conductive ceramic fiber is employed is also a factor in determining the diameter and length of the conductive ceramic fiber.

In forming an active paste which includes conductive ceramic fibers, the fibers should have dimensions sufficient to be processable with the active material of the paste. Typically, the size of the conductive ceramic fibers may vary from about 0.125–0.250 inches long and a diameter of about 0.001–0.005 inches, i.e. dimensions sufficient to retain the fibrous form within the active paste material.

Various batteries may be improved by using conductive ceramic fibers. For example, in NiCd batteries, the Ni foam electrode may be pasted with an active material of $Ni(OH)_2$ having about 10% conductive ceramic fibers of $Ti_4O_7$ and/or $Ti_5O_9$ having Ni therein. In NiMH batteries, a conductive ceramic fiber of $Ti_4O_7$ and/or $Ti_5O_9$ having Ni or Cu therein can be added to both the cathode of NiOH and anode formed of mischmetal hydride. In NiZn batteries, a conductive ceramic fiber of $Ti_4O_7$ and/or $Ti_5O_9$ having Cu therein may be added to a paste of ZnO.

Nickel electrodes also may employ conductive ceramic fibers by adding the fibers to the electrode material, principally NiOOH.

In a nickel-cadmium alkaline cell, porous nickel plates are used in both the positive and negative electrodes. The active material for the positive and negative electrodes is contained within the nickel plates. The positive plate contains nickel hydroxide while the negative plate contains cadmium hydroxide. To form improved electrodes for use in a Ni—Cd cell, a blend of NiOH, CdOH and 0.5–5% of conductive ceramic fiber of $Ti_4O_7$ and/or $Ti_5O_9$, each having Cu, Ni therein, is mixed with about 0.5–5% organic polymeric binder such as carboxy methylcellulose in aqueous solution sufficient to provide an active material paste.

In lithium containing batteries such as Li—$AgV_2O_5$, Li—CF, Li—CuO, Li—FeS, Li—$FeS_2$, Li—$I_2$, Li—$MnO_2$, Li—$MoS_2$, Li—$V_2O_5$, Li—$SOCl_2$, and Li—$SO_2$, especially useful ceramic conductive fibers include Li, Co, Cu or Ni in a ceramic matrix of $Ti_4O_7$ and/or $Ti_5O_9$. Ceramic conductive fibers or other conductive ceramic materials such as $Ti_4O_7$ or $Ti_4O_9$ having Co or Cu herein can be manufactured using the viscous suspension spinning process described by Cass in Ceramic Bulletin, No. 70, pages 424–429, 1991 or by other processes described herein.

In batteries in which a lithium compound of lithium thermodynamic activity less than that of lithium metal is the anode material (one example of which is lithium intercalated into graphite or petroleum coke, see J. M. Tarascon and D. Guyomard, Electrochimica Acta, 38: 1221–1231 (1992)) and the cathode material is selected from the group containing $AgV_2O_5$, $CF_x$, CuO, $MnO_2$, FeS, $FeS_2$, $TiS_2$, $MOS_2$, $V_2O_5$, $SOCl_2$, $SO_2$, and $I_2$, and lithium-containing materials derived therefrom (including those cathode materials suitable for "rocking chair" batteries as described by Michel Armand in "Materials for Advanced Batteries", eds. D. W. Murphy, J. Broadhead, and B. C. H. Steele, Plenum Press, New York, at page 160 and as described by J. M. Tarascon and D. Guyomard, Electrochimica Acta 38: 1221–1231 (1992)), ceramic conductive fibers may be added to the cathode material to enhance current collection. Especially useful ceramic conductive fibers include Ni, Co, Cu and NiCo alloy in a ceramic matrix of $Ti_4O_7$ and/or $Ti_5O_9$ with or without TiO. Ceramic conductive fibers such as $Ti_4O_7$—Ni, $Ti_5O_9$—Cu are available from ACI.

While the present invention has been described with respect to various specific embodiments and examples it is to be understood that the invention is not limited thereto and that it can be variously practiced within the scope of the following claims.

Powders

Electrically conductive ceramic powders are formed from the oxides of titanium or vanadium material that may or may not have metal containing additives and "in situ" reduction agents such as carbon, metal-containing intercalated graphite, graphite, and metal powders incorporated singly or mixtures dispersed therein. All materials for making electrically conductive ceramic powders are in powdery form and mixed to obtain a homogeneous mixture. For enhanced ceramic matrix reactivity, it is preferred that the particle size of the powders be in the range of 40 to 150 microns. This powder mixture is placed in a furnace at 300° C. to burn off the organics and then heated up to 1000–2000° C. in a reducing atmosphere of hydrogen or carbon monoxide or mixtures of these gases. In general, the reduced powdered mixture needs to be ground up to meet the particle size requires for an aspect ratio of 1.

Chips

Electrically conductive chips are made from the oxides of titanium or vanadium material that may or may not have metal containing additives and "in situ" reduction agents such as carbon, metal-containing graphite, graphite, and metal powders incorporated singly or mixtures dispersed therein. All materials for making electrically conductive ceramic chips are in powdery form and mixed to obtain a homogeneous mixture. A slip is made from this mixture and used in a tape casting process (See Mistler, Tape Casting Chapter in Engineered Materials Handbook, Vol. 4, 1992) which makes a dried or "green" (unfired) tape of the ceramic matrix. This dried tape is then cut into ceramic chips with a pasta or like cutting machine. The chips are then placed in a furnace in air at 300° C. to burn off the organics, then the furnace temperature is raised to 1000–2000° C. for sintering and after this the furnace atmosphere, but not the temperature, is changed to a reducing gas such as hydrogen or carbon monoxide or a mixture of both gases. For some electrochemical device applications, the dried tape can be thermally processed and reduced without cutting into chips for use as electrodes or layers in a multilayer chip capacitor. After thermally processing and reducing, the chips are roughly rectangular in size and the aspect ratio (aerodynamic definition (long dimension/short dimension)) is 8 or less. The hot chips are cooled in a dry, inert atmosphere and stored in a sealed container. At this point, the electrically conductive ceramic chips are ready to use.

Non-electrically conductive ceramic chips are made from alumina ($Al_2O_3$) or zirconia ($ZrO_2$) or zirconia-alumina material with no metal-containing additives or "in situ" reduction agents. All materials for making non-electrically conductive ceramic chips are in powdered form and are mixed to obtain a homogeneous mixture. A slip is made from this mixture and used in tape casting to make a dried tape of the ceramic matrix. This dried tape is then cut into ceramic chips with a pasta or like cutting machine. The chips are then placed in a furnace in air at 300° C. to burn off the organics, then the furnace temperature is raised to 1000–2000° C. for sintering and after this the furnace atmosphere, but not the temperature, is changed to a reducing gas such as hydrogen or carbon monoxide or a mixture of both gases. For some electrochemical device applications, the dried tape can be thermally processed without cutting into chips. The dried tape can then be cut into electrodes and coated with a metal or metals. for a particular application. After thermally processing, the chips are roughly rectangular in size and the aspect ratio (aerodynamic definition (long dimension/short dimension)) is 8 or less. The hot chips are cooled in a dry, inert atmosphere and stored in sealed containers. At this point, the non-electrically conductive ceramic chips are ready to be coated, plated, or deposited with a metal or metals to make them electrically conductive and/or catalytically active.

Substrates

For substrate (grids, electrodes, current collectors, separators, porous sheets, foam, honey-comb sheets, solid sheets) fabrication, the electrically conductive ceramic materials, fibers, powders and chips can be mixed with a suitable binding agent and filler and the resulting mixture molded in a ram press or extruded into the desired shape. The shape is then vitrified in a non-oxidizing atmosphere at 1000–2000° C. to inhibit the oxidation of the sub-oxides of the titanium or vanadium. After this vitrification process, the cooled substrates are ready for use. The ceramic foam can be made by the Scotfoam process (Selee Corporation).

Activation of Non-electrically Conducting Materials

Since the electrically conducting ceramic fibers, powders, chips and substrates have their own intrinsic electrical conductivity developed by metal compound additives and/or by a reduction of the metal sub-oxide, it only remains for the non-electrically conducting ceramic fibers, powders, chips and substrates to be made electrically conductive. The increase in electrical conductivity for the non-electrically conductive ceramic materials as well as electrically conductive substrates is done by plating or coating or deposition of singly or a mixture thereof metallic d-block transition elements (Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Lanthanides (Ce, Pr, Nd, Pm, Sm, Eu, Gd, Tb, Dy, Ho, Tm, Yb, Lu) and by the addition or plating or coating or deposition singly or a mixture thereof selected main-group elements (In, Tl, Sn, Pb, Sb, Bi, Se, Te). All materials used should have a purity level that excludes deleterious substances for this process as well as the projected use. There are several metal plating, metal deposition and ceramic coating techniques that can be used to treat the non-electrically conductive material and they are as follows: (1) electroless plating for non-conductors using a reducing solution of either formaldehyde or hydrazine to plate out the desired metal or metals (see Lowenheim, Electroplating, pages 387–425, 1978 and 1994 Products Finishing Directory, page 112–130); (2) thermal metal spraying (See Thorp, Chemical Engineering Progress, pages 54–57, 1991) of the desired metal or metals and electrically conductive ceramic; and (3) layer-by-layer deposition:ion beam sputtering and laser-deposition (Beardsley, Scientific American, pages 32–33, 1995 and Wasa, et al., Science and Technology of Thin Film Superconductors-2, pages 1–2) to deposit electrically conductive ceramic materials as defined in this invention, and any other method to provide suitable plating, coating or deposition of the desired metal. Once the non-electrically conductive ceramics have been interacted with metal, metals or electrically conductive ceramic, they are now ready for use.

What is claimed is:

1. An active paste having conductive ceramic fibers, said fibers having a length of about 10 microns to about 10,000 microns and a length to diameter ratio of about 1 to about 100.

2. The active paste of claim 1 having conductive ceramic fibers,
    said fibers having a length of about 3,175 microns to about 6,350 microns and a diameter of about 0.002 inches to about 0.007 inches.

3. The active paste of claim 1 wherein said active paste comprises a material selected from the group consisting of PbO and $PbSO_4$.

4. The active paste of claim 3 wherein said ceramic fiber comprises $Ti_4O_7$, $Ti_5O_9$, $Ti_4O_7$ having an additive selected from the group consisting of $SnO_2$, Cu, Ni, and Co, $Ti_5O_9$ having an additive selected from the group consisting of $SnO_2$, Cu, Ni, and Co, and mixtures thereof and
    a second fiber selected from the group consisting of carbon fibers, nickel fibers, stainless steel fibers, olefin fibers, cellulosic fibers, polyester fibers, and composite fibers.

5. The active paste of claim 4 wherein said second fiber is present in said paste in an amount of about 1% to about 30% based on total weight of active paste.

6. The active paste of claim 5 wherein said olefin fibers are selected from the group consisting of polyethylene and polypropylene.

7. The active paste of claim 4 wherein said composite fibers are lead coated glass fibers.

8. A conductive composition comprising ceramic conductive fiber, metal fiber and olefin fiber wherein said conductive fiber comprises $Ti_4O_7$, said metal fiber is Ni, and said olefin fiber is polypropylene.

9. The composition of claim 8 wherein said conductive ceramic fiber is present in said composition in an amount of about 30% to about 70%,
    said metal fiber is present in said composition an amount about 20%, and
    said olefin fiber is present in said composition an amount of about 10%.

10. A conductive composition comprising ceramic conductive fiber, metal fiber and olefin fiber wherein said conductive fiber comprises $Ti_5O_9$ intercalated with Nb, said metal fiber is stainless steel, and said olefin fiber is polypropylene.

11. The composition of claim 10 wherein said conductive ceramic fiber is present in said composition in an amount of about 30% to about 70%,
    said metal fiber is present in said composition an amount of about 60% to about 70%, and
    said olefin fiber is present in said composition an amount of about 10% to about 20%.

12. A conductive composition comprising a conductive ceramic fiber and an organic fiber wherein said ceramic fiber is metal containing $SnO_2$ and said organic fiber is polypropylene.

13. The composition of claim 12 wherein said fiber is present in said composition an amount of about 90% and said polypropylene is present in an amount of about 10%.

14. A conductive composition comprising a conductive ceramic fiber and an organic fiber selected from the group consisting of polyolefins and polyesters wherein said ceramic fiber is $Ti_4O_7$ intercalated with Cu, and said polyolefin is polypropylene.

15. The composition of claim 14 wherein said ceramic fiber is present in said composition in an amount of about 90% and said polypropylene is present in an amount of about 10%.

16. A conductive composition comprising a conductive ceramic fiber and an organic fiber selected from the group consisting of polyolefins and polyesters wherein said ceramic fiber is $Ti_4O_7$ and said organic fiber is polyester.

17. The composition of claim 16 wherein said ceramic fiber is present in said composition an amount of about 50% to about 90% and said polyester is present in said composition in an amount of about 10% to about 50%.

18. A current collector for a lead acid battery, said collector having from about 50% to about 100% of a conductive ceramic fiber of $Ti_4O_7$ having an oxide additive selected from the group consisting of $SnO_2$, $WO_3$, mixtures of TiO and $Ti_4O_7$ and mixtures of TiO and $Ti_5O_9$.

19. A fiber comprising an electrically conductive composition comprising about 80 to about 90% $Ti_nO_{2n-1}$ where n=4 or greater, up to about 10% TiO, at least 1% of a mixture of $Ti_2O_3$ and $Ti_3O_5$, up to about 10% of an additive selected from the group consisting of M oxides, and/or borides, and/or carbides, and/or nitrides and/or free metal, and wherein M=Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Ce, Pr, Nd, Pm, Sm, Eu, Gd, Tb, Dy, Ho, Tm, Yb, Lu, B, Al, Tl, Si, Ge, Sn, Pb, As, Sb, Bi, Se, Te.

20. The fiber of claim 19 wherein said fiber has a diameter of less than about 200 microns.

21. The fiber of claim 20 wherein said fiber has a diameter less than about 100 microns.

22. The fiber of claim 21 wherein said fiber has a diameter less than about 50 microns.

23. The fiber of claim 22 wherein said fiber has a diameter less than about 20 microns.

24. A NiCd battery having about 0.1 to about 20% conductive ceramic fibers, said fibers selected from the group consisting of $Ti_4O_7$ having a Ni additive, and mixtures of TiO and $Ti_4O_7$ having a Ni additive.

25. A lead acid battery having a cathode, said cathode having an active paste material wherein the active paste material comprises $PbO_2$ and about 5% to about 10% conductive ceramic fiber.

26. A lead acid battery having a cathode, said cathode having an active paste material wherein the active paste material comprises $PbO_2$ and about 5% to about 10% conductive ceramic fiber wherein said ceramic fiber is selected from the group consisting of $Ti_4O_7$ having metal containing $SnO_2$ and $Ti_5O_9$ having metal containing $SnO_2$.

27. The battery of claim 26 wherein said metal containing $SnO_2$ is present in said fiber an amount of about 0.5% to about 1.8%.

28. A Zn—$MnO_2$ battery having an active paste comprising $MnO_2$ and about 1–30% conductive ceramic fibers selected from the group consisting of $Ti_4O_7$ having Cu additive, and $Ti_5O_9$ having Cu additive.

29. A Li—$MnO_2$ battery having about 1–10% conductive ceramic fibers selected from the group consisting of $Ti_4O_7$ having Cu additive, and $Ti_5O_9$ having Cu additive.

30. A NiMH battery having about 1–10% conductive ceramic fibers selected from the group consisting of $Ti_4O_7$ having Co additive, and $Ti_5O_9$ having Co additive.

31. A NiCd battery having a Ni foam electrode, said electrode fasted with an active material comprising $Ni(OH)_2$ and conductive ceramic fibers.

32. The battery of claim 31 wherein said conductive ceramic fibers are selected from the group consisting of $Ti_4O_7$, having Ni additive, and $Ti_5O_9$ having Ni additive.

33. The battery of claim 32 wherein said conductive ceramic fibers are present in an amount of 10%.

34. A NiMH battery having a cathode of NiOH and an anode comprising mishmetal hydride,
said cathode having a conductive ceramic fiber comprising $Ti_4O_7$, $Ti_5O_9$, $Ti_4O_7$ having Cu additive, $Ti_{59}$ having Cu additive, $Ti_4O_7$ having Ni additive, $Ti_5O_9$ having Ni additive, and mixtures thereof.

35. The NiMH battery of claim 34 wherein said anode comprises a conductive ceramic fiber selected from the group consisting of $Ti_4O_7$, $Ti_4O_7$ having Cu additive, $Ti_5O_9$ having Cu additive, $Ti_4O_7$ having Ni additive, $Ti_5O_9$ having Ni additive, and mixtures thereof.

36. A NiZn battery having an active paste comprising ZnO, said paste having a conductive ceramic fiber selected from the group consisting of $Ti_4O_7$, $Ti_5O_9$, $Ti_4O_7$ having Cu additive, $Ti_5O_9$ having Cu additive, and mixtures thereof.

37. A Ni—Cd alkaline cell having an electrode comprising an active material paste, said paste comprising NiOH, CdOH, and conductive ceramic fiber.

38. The cell of claim 37 wherein said conductive fiber is present in said active paste in an amount of about 0.5% to about 5% by weight, based on the weight of the active paste.

39. The cell of claim 38 wherein said conductive ceramic fiber is selected from the group consisting of $Ti_4O_7$, $Ti_5O_9$, $Ti_4O_7$ having Cu additive, $Ti_5O_9$ having Cu additive, $Ti_4O_7$ having Ni additive, $Ti_5O_9$ having Ni additive, $Ti_4O_7$ having Cu and Ni additive, $Ti_5O_9$ having Cu and Ni additives, and mixtures thereof.

40. The cell of claim 39 wherein said active paste further comprises an organic polymeric binder.

41. The cell of claim 40 wherein said polymeric binder is carboxy methyl cellulose.

42. The cell of claim 41 wherein said carboxy methylcellulose is present in said active paste in an amount of about 0.5–5%.

43. A Li containing battery having a conductive ceramic fiber selected from the group consisting of $Ti_4O_7$, $Ti_5O_9$, $Ti_4O_7$ having Li additive, $Ti_5O_9$ having Li additive, $Ti_4O_7$ having Co additive, $Ti_5O_9$ having Co additive, $Ti_4O_7$ having Cu additive, $Ti_5O_9$ having Cu additive, $Ti_4O_7$ having Ni additive, $Ti_5O_9$ having Ni additive and mixtures thereof.

44. The battery of claim 43 wherein said battery is a $AgV_2O_5$ battery.

45. The battery of claim 43 wherein said battery is a Li—CF battery.

46. The battery of claim 43 wherein said battery is a Li—CuO battery.

47. The battery of claim 43 wherein said battery is a LiFeS battery.

48. The battery of claim 43 wherein said battery is a Li—$FeS_2$ battery.

49. The battery of claim 43 wherein said battery is a Li—$I_2$ battery.

50. The battery of claim 43 wherein said battery is a Li—$MnO_2$ battery.

51. The battery of claim 43 wherein said battery is a Li—$MoS_2$ battery.

52. The battery of claim 43 wherein said battery is a Li—$V_2O_5$ battery.

53. The battery of claim 43 wherein said battery is a Li—$SOCl_2$ battery.

54. The battery of claim 43 wherein said battery is a Li—$SO_2$ battery.

55. A Li containing battery having an anode comprising Li and a cathode comprising ceramic conductive fibers.

56. The Li containing battery of claim 55 wherein said cathode comprises a compound selected from the group consisting of $AgV_2O_5$, $CF_x$, CuO, $MnO_2$, FeS, $FeS_2$, $TiS_2$, $MoS_2$, $V_2O$, $SOCl_2$, $SO_2$, and I.

57. The Li containing battery of claim 56 wherein said conductive ceramic fibers are selected from the group consisting of $Ti_4O_7$, $Ti_5O_9$, $Ti_4O_7$ having Ni additive, $Ti_5O_9$ having Co additive, $Ti_4O_7$ having Cu additive, $Ti_5O_9$ having Cu additive, $Ti_4O_7$ having NiCo alloy additive, $Ti_5O_9$ having NiCo alloy additive, $Ti_5O_9$ having NiCo alloy additive and mixtures thereof.

58. An electrical energy device capable of at least one of generating electrical energy or storing electrical energy having at least one electrode having conductive ceramic fibers, said electrode having a current collector and active paste material, said fibers having a length of about 10 to about 10,000μ and a length to diameter ratio of about 1 to about 20 wherein said conductive fibers include a metal containing additive, and wherein said fibers are present in said paste material in an amount of about 0.1 to 30% by weight of said paste.

59. The electrical energy device of claim 58 wherein said fibers are present in said active paste material in an amount of about 5 to 20% by weight of said active paste material.

60. An electrical energy device having an electrode having conductive ceramic fibers,
said fibers having a length of about 10 to about 10,000μ and a length to diameter ratio of about 1 to about 20,
said fibers including a metal containing additive,
said electrode having at least one of a current collector and active paste material,
wherein said fibers are present in said collector in an amount of about 50 to 100% by weight of said collector.

61. An electrical energy device having at least one component having conductive ceramic fibers, said fibers having a length of about 10 to about 10,000$\mu$ and a length to diameter ratio of about 1 to about 20,
   wherein said fibers include a metal containing additive,
   wherein said device includes an electrode having conductive ceramic fibers, said electrode having at least one of a current collector and active paste material, and
   wherein said fibers are present in said active paste material in an amount of about to 0.1–30% by weight of said active paste material.

62. An electrical energy device having at least one component having conductive ceramic fibers, said fibers having a length of about 10 to about 10,000$\mu$ and a length to diameter ratio of about 1 to about 20,
   said conductive ceramic fibers including a matrix material and a metal containing additive,
   said device including an electrode having conductive ceramic fibers,
   said electrode having at least one of a current collector and active paste material,
   wherein said conductive ceramic fibers are present in at least one of said current collector or said active paste material,
   wherein said matrix material is selected from the group of oxides, carbides, nitrides, and borides.

63. An electrical energy device having at least one component having conductive ceramic fibers, said fibers having a length of about 10 to about 10,000$\mu$ and a length to diameter ratio of about 1 to about 20,
   wherein said fibers include a metal containing additive and
   wherein said electrical energy device is at least one of thermal sensors and chemical sensors.

64. A lead-acid battery having a plurality of electrodes, said electrode comprising an active paste material and a current collector, wherein conductive ceramic fibers are included in at least one said active paste material and said current collector,
   wherein said active paste material is lead dioxide and said conductive ceramic fibers have a substoichiometric titanium dioxide matrix and a Sn—Pb alloy dispersed within said matrix.

* * * * *